United States Patent
Fischer et al.

(10) Patent No.: US 7,804,253 B2
(45) Date of Patent: Sep. 28, 2010

(54) SELF-EXCITING STEP-UP CONVERTER

(75) Inventors: Klaus Fischer, Friedberg (DE); Josef Kreittmayr, Bobingen (DE)

(73) Assignee: Osram Gesellschaft Mit Beschraenkter Haftung, Munich (DE)

( * ) Notice: Subject to any disclaimer, the term of this patent is extended or adjusted under 35 U.S.C. 154(b) by 581 days.

(21) Appl. No.: 11/918,945

(22) PCT Filed: Mar. 22, 2006

(86) PCT No.: PCT/DE2006/000507

§ 371 (c)(1),
(2), (4) Date: Oct. 22, 2007

(87) PCT Pub. No.: WO2006/111121

PCT Pub. Date: Oct. 26, 2006

(65) Prior Publication Data

US 2009/0295301 A1    Dec. 3, 2009

(30) Foreign Application Priority Data

Apr. 22, 2005  (DE) ...................... 10 2005 018 794

(51) Int. Cl.
*H05B 37/00* (2006.01)
(52) U.S. Cl. ........................ 315/224; 315/223; 315/240; 315/242
(58) Field of Classification Search .................. 315/237, 315/224, 219, 223, 227 R, 240, 241 R, 242, 315/243
See application file for complete search history.

(56) References Cited

U.S. PATENT DOCUMENTS 7,061,188 B1 * 6/2006 Katyl et al. .................. 315/291
7,084,580 B2 * 8/2006 Muramatsu et al. ......... 315/219

OTHER PUBLICATIONS

Nicolas Cyr: "RC Network Quashes Auxiliary Winding in Quasiresonant Converter". EDN, [Online] Apr. 1, 2004, p. 98, XP002393181, Retrieved From the Internet:, URL:HTTP://WWW.EDN.COM/CONTENTS/IMAGES/401 04DI.PDF> [Retrieved on Aug. 2, 2006] col. 1, Lines 21-26.
Jeff Falin: "The TPS61042 As a Standard Boost Converter" [Online] 2004, Texas Instruments, Dallas Texas, XP002393186, Retrieved From the Internet; URL:HHTP///FOCUS. TI.COM/LIT/AN/SLVAL25A/SLVAL25A.PDF> [Retrieved on Aug. 2, 2006].
Christophe Basso:, "A 30W Power Supply Operating in Quasi-Square Wave Resonant Mode", [Online], 2003, on Semiconductor, Denver- Colorado-USA, XP002393187 Retrieved From the Internet:, URL:HTTP//WWW.ONSEMI.COM/PUB/COLLATERAL/A ND8129-D3PDF> [Retrieved on Aug. 2, 2006].

* cited by examiner

Primary Examiner—David Hung Vu

(57) ABSTRACT

An electronic ballast includes a step-up converter, which includes a storage inductor, a diode, an intermediate circuit condenser and a switch element. According to the invention, a current passing through the storage inductor is used in the form of an indicator of turnon and turnoff times of the step-up converter oscillates in a self-exciting manner.

19 Claims, 5 Drawing Sheets

SELF-EXCITING STEP-UP CONVERTER

TECHNICAL FIELD

The invention relates to an electronic ballast with a step-up converter for operating a discharge lamp, for example a low-pressure discharge lamp.

PRIOR ART

Electronic ballasts for operating discharge lamps are known in various embodiments. In general, they contain a rectifier circuit for rectifying an AC voltage supply and charging a capacitor, which is often referred to as an intermediate circuit capacitor. The DC voltage present at this capacitor is used for supplying an inverter, which drives the discharge lamp. In principle, an inverter produces a supply voltage for the discharge lamp to be operated with high-frequency current from a rectified AC voltage supply or a DC voltage supply. Similar apparatuses are also known for other lamp types, for example in the form of electronic transformers for halogen lamps.

Step-up converter circuits for system current harmonic reduction of discharge lamps are known per se. They have a storage inductor, a switching element, a diode and an intermediate circuit capacitor. The intermediate circuit capacitor supplies, for example, a discharge lamp via an inverter circuit.

DESCRIPTION OF THE INVENTION

The invention is based on the technical problem of specifying an improved electronic ballast with a step-up converter.

The invention relates to an electronic ballast for a lamp with a step-up converter, which has a storage inductor, a diode, an intermediate circuit capacitor and a switching element, characterized in that it is designed to switch off the switching element in the step-up converter when a maximum current value of the current flowing through the switching element is reached, and to switch on the switching element by means of a jump in the potential between the storage inductor and the diode after demagnetization of the storage inductor, so that the step-up converter oscillates in self-excited fashion.

Preferred configurations of the invention are specified in the dependent claims and will be explained in more detail below. The disclosure in this case always relates both to the method category and the apparatus category of the invention.

The switch-on and switch-off times of the switching element are very significant for the function of a step-up converter. The invention is based on the knowledge that the value of the current through the storage inductor may be suitable as an indicator for the switch-on and switch-off times of the switching element for operation.

In the switched-on state, the switching element ensures an increasing current flow in the storage inductor up to a maximum value which can be set. In this case, the storage inductor is magnetized. The electronic ballast according to the invention is designed such that the current through the storage inductor, when the switching element is switched on, is detected for example by means of a measuring (shunt) resistor and, when this maximum value is reached, the switching element is switched off. Once the switching element has been switched off, the diode conducts the current impressed in the storage inductor into the intermediate circuit capacitor. This current decreases over time. If the storage inductor has been completely demagnetized, there is no longer any current flowing through it and the diode, which is connected in series, is off. The potential between the storage inductor and the diode jumps from the supply potential of the intermediate circuit capacitor to a potential with a considerably smaller absolute value, which corresponds to the instantaneous potential of the rectified AC voltage supply. This potential jump can be used as an indicator of a switch-on time of the switching element. The invention is designed such that the switching element is now switched on. Current is again flowing through the switching element and the storage inductor. In this case, the storage inductor is remagnetized.

The described sequence of such a switch-on and switch-off cycle can repeat itself without any forced control of the switching element. This can be referred to as "self-excited" oscillation. The ballast according to the invention is therefore particularly simple in terms of control and circuitry. Furthermore, it is also particularly robust with respect to tolerances of the storage inductor inductance.

Preferably, the jump in the potential between the storage inductor and the diode after the demagnetization of the storage inductor is detected by at least one output capacitor. This potential jump can be used as an indicator of the switch-on time of the switching element. A resistor can be connected in series with said output capacitor.

The time constant from this resistor and the output capacitor is so great that complete charging or discharging of the output capacitor does not occur during the demagnetization of the storage inductor.

In an alternative embodiment, the demagnetization is detected by a coil which is secondary to the storage inductor.

The measuring resistor, which is preferably used for measuring the current for determining the switch-off time of the switching element, can be connected in series with the switching element, advantageously in the connection between the switching element and the reference potential.

Preferably, an embodiment of the invention has a first signal line, which connects the control input of the switching element to a control circuit of the step-up converter. In this case, the signal line can be connected directly to the control input of the switching element, or else indirectly via a circuit, which switches the switching element, or one or more resistors. The step-up converter can therefore be blocked by means of the signal line by the control circuit.

A preferred embodiment of the invention has a resistor between the supply potential of the intermediate circuit capacitor and the control input of the switching element. If a sufficient voltage is present at the intermediate circuit capacitor, the switching element can be switched on via this resistor. That is to say that the oscillation can be stimulated automatically as no special control signals are required.

A preferred embodiment of the invention has a threshold value element for driving the switching element. The control input of this threshold value element is preferably connected to the potential between the storage inductor and the diode via the output capacitor and at least one resistor. Over this path, the jump in the potential between the storage inductor and the diode after the demagnetization of the storage inductor can be used as an input signal for the threshold value element. Furthermore, the control input of the threshold value element is connected to the potential between the switching element and the measuring resistor via at least one resistor. Over this path, the threshold value element can be controlled as a function of the current through the switching element. In order that the control input of the switching value element is at a defined potential at the time at which the switching element is switched on, it can be connected to the reference potential via a series circuit comprising a resistor and a diode. The node between this resistor and the diode is in this case connected to the series circuit comprising the output capacitor and at least one resistor. It is thus possible to ensure that the rise in the voltage across the measuring resistor determines the temporal dependence of the drive potential of the threshold value element while the switching element is switched on.

With such circuitry for the components, a cycle of the step-up converter is as follows: in a first time section, the switching element is switched on. The current through the switching element is measured via the measuring resistor, which is connected in series with the switching element. In this first time section, this current also corresponds to the current through the storage inductor. The potential which is tapped off at the measuring resistor is supplied to a control input of the threshold value element, possibly via one or more resistors, as an input signal. If the value of the current exceeds a predetermined maximum, the threshold value element is switched. The required connection to the reference potential can be produced via the series circuit (proposed in the preceding paragraph) comprising a diode and a resistor. The maximum depends on the selected dimensions for the components of the circuit and in this regard is predeterminable. In particular, these component parts may be: the measuring resistor, a resistor via which the voltage across the measuring resistor is tapped off and supplied to the control input of the threshold value element, and the resistor which produces the connection to the reference potential in series with the diode. The output of the threshold value element is connected to the control input of the switching element and switches it off. The potential between the storage inductor and the diode jumps to approximately the supply potential of the intermediate circuit capacitor when the switching element is switched off. This marks the end of the first time section.

In a following, second time section, the threshold value element remains in its state owing to the output capacitor because the potential between the storage inductor and the diode only jumps back again when the storage inductor is demagnetized and the threshold value element is kept in its state via the output capacitor. The switching element in this case remains switched off. This state is held as long as the storage inductor demagnetizes. If the switching element were not to be switched off permanently by the threshold value element, the switching element could be switched on again prematurely via the voltage at the intermediate circuit capacitor as soon as the storage inductor has demagnetized. The potential between the storage inductor and the diode jumps from the supply potential of the intermediate circuit capacitor to a potential with a much smaller value, which corresponds to the instantaneous potential of the rectified AC voltage supply. The threshold value element is switched via the output capacitor. The switching element is switched on and a new cycle begins.

It can be gleaned from the above description that the clock of the step-up converter is determined by the duration of the demagnetization of the storage inductor. No further timing elements are required.

Since when a supply voltage is first applied the output capacitor and the intermediate circuit capacitor are charged directly by the supply voltage, the drive potential of the threshold value element cannot pass the switching threshold in a time which is considerably longer than the period duration of the switch-on/switch-off cycles of the step-up converter during operation. The threshold value element cannot easily be switched until the intermediate circuit capacitor has been charged to the instantaneous value of the supply voltage which is highest in terms of absolute value. During this time, the step-up converter is blocked.

Preferably, an embodiment of the invention with a threshold value element therefore has a second signal line, which is connected to the control input of the threshold value element and to the control circuit. In this case, this second signal line can be connected to the control input of the threshold value element via the resistor from the series circuit comprising the diode and the resistor, which series circuit connects the control input of the threshold value element to the reference potential. The threshold value element can be switched by the control circuit via the second signal line. The step-up converter is therefore no longer blocked during first charging of the intermediate circuit capacitor.

The use of transistors as a simple embodiment of a threshold value element may have the disadvantage that the maximum current through the storage inductor depends on the tolerance of the switching threshold of the transistor, which tolerance is not negligible. The transistor can in this case also have a driver function for the switching element.

In a further preferred embodiment of the invention, a comparator is therefore used as the threshold value element and preferably a driver circuit is connected downstream of said comparator. Thus, the dependence of the switch-on current threshold of the threshold value element on component tolerances and temperature dependencies can be reduced. A driver circuit generally comprises a plurality of component parts and may also have, inter alia, one or more transistors.

As has already been described once further above, the control input of the threshold value element can be connected to the reference potential via a resistor and a diode, the resistor being connected to the control input of the threshold value element. The series circuit comprising the output capacitor and the resistor can be joined at the node between this resistor and the diode. Preferably, in an embodiment of the invention, a capacitor is connected in parallel with the resistor at the control input. The capacitor acts as a differentiating element, so that the jump in the potential after the demagnetization of the storage inductor is transferred differentially to the input of the comparator, which may accelerate the driving.

A reference signal is present at an input of the comparator, and the signals of interest are present at the other input, which signals are produced by the measuring resistor and the output capacitor. Preferably, a DC voltage is superimposed on this signal input, which DC voltage raises the potential of this input further away from the reference potential. For this purpose, the input node of the comparator can be connected to the supply potential of the comparator, for example via a resistor.

In a preferred embodiment of the invention, the reference signal is proportional to the instantaneous value of the supply voltage. The current drawn by the step-up converter can therefore be approximately sinusoidal.

It is often desirable to operate step-up converters selectively directly on the system supply or using a phase gating dimmer. In this case, the step-up converter may need to match its operation to a supply with or without a phase gating dimmer. This may be the case, for example, if the operation of the step-up converter in one of the two cases does not conform to standards with respect to system current harmonics or the step-up converter in one of the two cases is not functioning effectively without its operation being changed over. It is then necessary for it to be possible for the electronic ballast to identify whether it is being operated directly on the system supply or using a phase gating dimmer; it is then possible for corresponding operational parameters to be set, for example the switch-off current threshold.

Operation using a phase gating dimmer changes the supply voltage present at the electronic ballast in a characteristic fashion. This is utilized by the invention. Phase gating dimmers only make the system supply available to the ballast after a time, which can be set, within each system half-cycle. During the phase gating, no input voltage is present at the ballast. After this time, approximately the original supply voltage is present. The voltage at the input of the electronic ballast has a steep edge after the phase gating; jumps in the supply voltage occur.

An embodiment of the invention has a differentiator, which is connected between a system line and the reference potential of the ballast. This differentiator outputs the voltage jumps in the supply voltage. At its output, relatively large peak voltages in terms of absolute value occur in the case of a voltage jump. These peak voltages, after any further processing, for example in the form of peak value identification, can be supplied to a control circuit of the step-up converter, which can then correspondingly set the operational parameters of the step-up converter.

Particular problems result in the case of selective operation of step-up converters using a phase gating dimmer or directly on the system supply. If, for example, the step-up converter is designed exclusively for operation using a phase gating dimmer, as in EP 1 465 330 A2, in this case the following problem may occur in the event of the lack of a phase gating dimmer: from a certain time within a system half-cycle of the supply system at which time the intermediate circuit capacitor has been sufficiently charged, the current supply of the discharge lamp is generally interrupted during the remaining time of this half-cycle. Since there is no phase gating in the case of direct operation on the supply system, it is possible that the step-up converter draws no further current even relatively early on within a system half-cycle. The power factor as a quotient of the active power and the apparent power is low. Furthermore, it is necessary in accordance with the standard IEC 61000-3-2 to ensure a current consumption beyond a phase angle of 90°.

Preferably, the electronic ballast detects, by means of the differentiator, whether a phase gating dimmer is connected upstream. If the ballast is functioning directly on the system supply, the operational parameters of the step-up converter are set in such a way that it can function so as to conform to standards. This can take place by means of a reduction in the switch-off current threshold of the step-up converter. The step-up converter then draws a current having a lower amplitude. In order to charge the intermediate circuit capacitor to its maximum value, current is now drawn by the step-up converter over a longer period of time within a system half-cycle. The switch-off current threshold, in order to comply with the standard, can be set in such a way that the current consumption of the step-up converter extends as far as beyond a phase angle of 90°.

The longer the time interval of the current consumption within a system half-cycle is, the greater the power factor of the ballast also is. Preferably, the operational parameters—in particular the switch-off current threshold—of the step-up converter are set in such a way that the current is drawn in the absence of a phase gating dimmer at least over half the duration of a system half-cycle.

In a particularly simple and therefore preferred embodiment of the invention, the differentiator has a series circuit comprising a capacitor and a resistor. This series circuit can be connected to one of the system lines in series with the reference potential of the electronic ballast. A further capacitor can be connected to the other system line by the node between the resistor and the capacitor. Given suitable dimensions for the capacitance and the resistance, a voltage which is proportional to the differentiated supply voltage is present at the resistor. One advantage of this simple implementation is the low number of component parts required.

Preferably, a peak value detection circuit is connected in parallel with the resistor from the differentiator circuit described in the previous paragraph. If the step-up converter is operated using a phase gating dimmer, the controller of the step-up converter can be driven by the peak value detected via the resistor, for example by means of a switching element which is connected to the peak value detection.

BRIEF DESCRIPTION OF THE DRAWINGS

The invention will be explained in more detail below with reference to exemplary embodiments. The individual features disclosed in the process can also be essential to the invention in other combinations. The description above and below relates to the apparatus category and the method category of the invention, without this explicitly being mentioned in detail.

PREFERRED EMBODIMENT OF THE INVENTION

Figure 1:
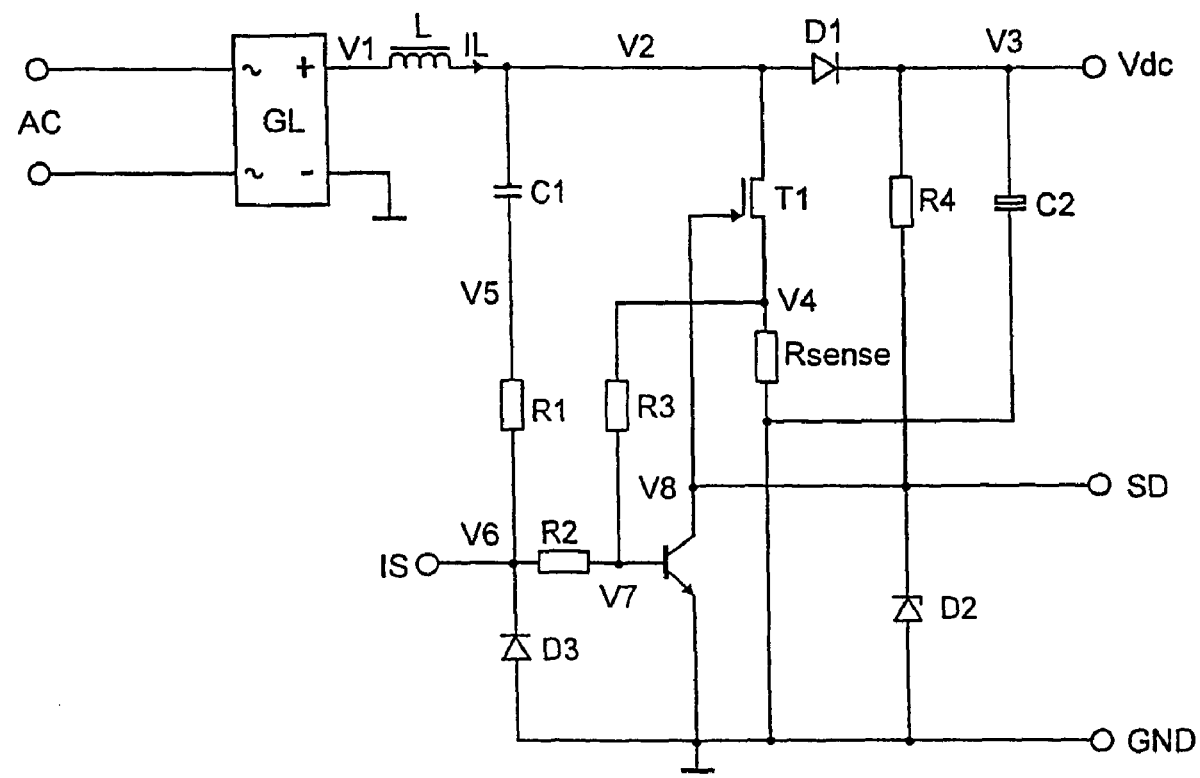
FIG. 1 shows a step-up converter circuit. This is to be regarded as being part of an electronic ballast according to the invention.

FIG. 1 shows a step-up converter circuit. It is to be considered part of an electronic ballast according to the invention.

A voltage, which is supplied via an AC voltage input AC and is rectified by a rectifier GL, is present at the circuit arrangement between a node V1 and a reference potential GND.

A first series circuit comprising a storage inductor L, a diode D1 and an intermediate circuit capacitor C2 is connected at the output of the rectifier.

The connection between the storage inductor L and the diode D1 represents a node V2. A series circuit comprising a switching element T1 and a (measuring or shunt) resistor Rsense is connected between the node V2 and the reference potential GND. The switching element T1 can be in the form of a MOSFET. The resistor Rsense is connected to the reference potential GND. A node V8 is at the potential of the control input of the switching element T1.

A threshold value element T2 is connected between the control input of the switching element T1 and the reference potential GND. The threshold value element T2 can be in the form of a (bipolar) transistor. There follows in the text below an exemplary embodiment with a comparator as the threshold value element. A node V7 is at the potential of the control input of the threshold value element T2. A resistor R3 connects a node V4 between T1 and Rsense to the node V7.

A series circuit comprising an output capacitor C1, a resistor R1 and a diode D3 is positioned between the node V2 and the reference potential GND. A node V6 is positioned at the connection between the resistor R1 and the diode D3.

A resistor R2 is positioned between the node V6 and the node V7. A node V3 is positioned at the connection between the diode D1 and the capacitor C2.

A series circuit comprising a resistor R4 and a diode D2 is connected between the node V3 and the reference potential GND. The connecting node between the diode D2 and the resistor R4 is connected to the control input of the first switching element T1. The diode D2 is in the form of a Zener diode.

A signal line IS is connected to the node V6. Said signal line can be set to the reference potential GND for a short period of time by a control circuit.

A second signal line SD is connected to the control input of the switching element T1. The control circuit can block the step-up converter using this signal line.

Figure 2:
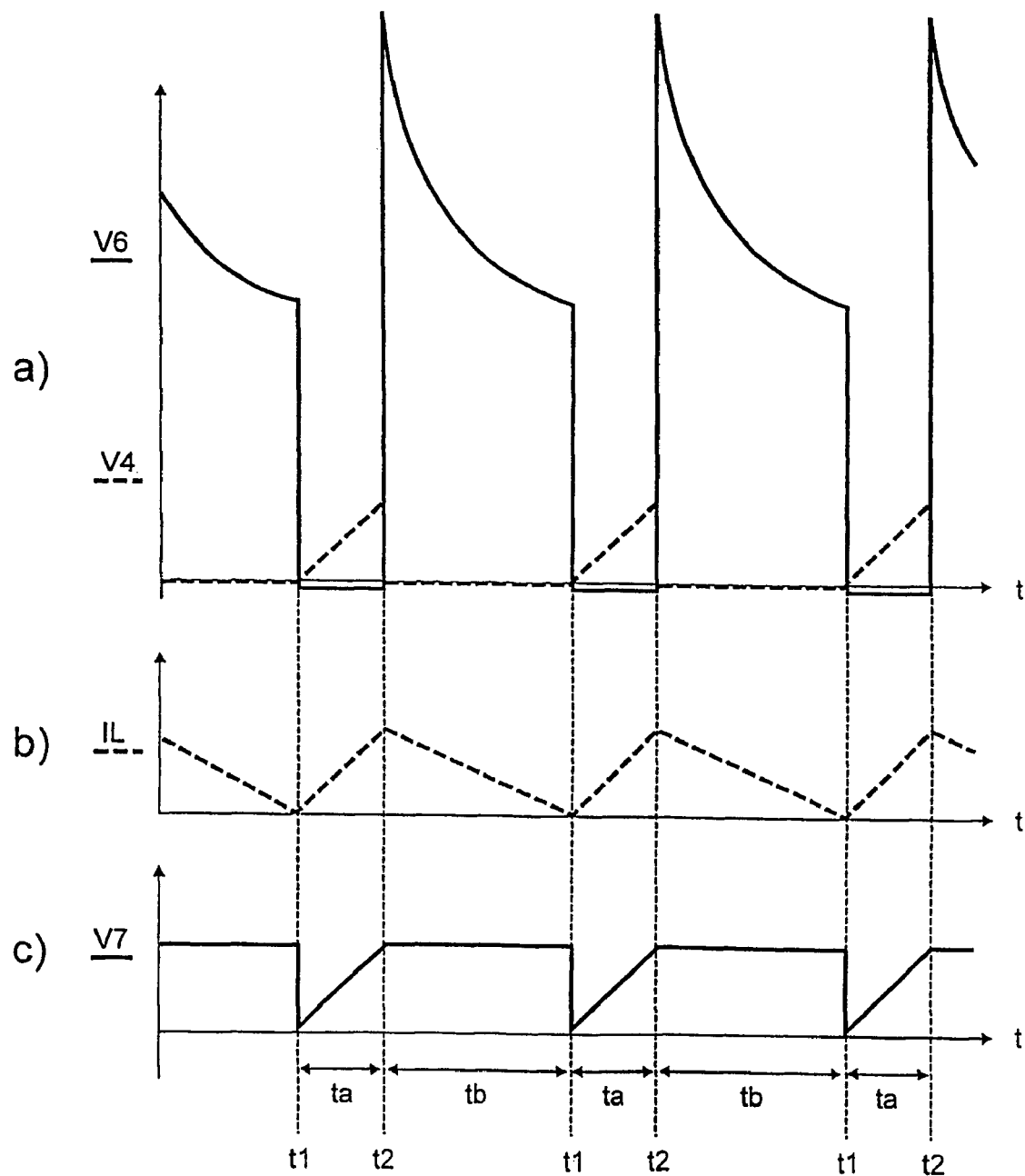
FIGS. 2a, b, c show relevant current and voltage profiles of the circuit arrangement shown in FIG. 1.

FIG. 2a shows the potential at the node V6 and at the node V4 as a function of time. A current IL flows through the storage inductor L. A voltage, which is proportional to the current IL through the storage inductor L, is measured at the node V4 by means of the resistor Rsense. The potential reflects the magnetization state of the storage inductor L at the node V6. This is ensured by the output capacitor C1. If the storage inductor is magnetized, the output capacitor C1 will discharge. The potential at the node V6 in this case approximately corresponds to the reference potential GND because it is caused by the diode D3 to stick at a negative value with respect to the reference potential GND which corresponds to the forward voltage. If the storage inductor L is then demagnetized, the output capacitor C1 is charged. A potential is formed at the node V6 which is markedly above the reference potential GND. The output capacitor C1 is dimensioned such that the time constant comprising the capacitance C1 and the resistance R1 is so great that complete charging of the output capacitor C1 does not occur during the demagnetization of the storage inductor L, in the time interval tb, and the potential at the node V6 remains above the switch-on threshold of the threshold value element T2.

In FIGS. 2a, b, c, intervals ta and tb and times t1 and t2 are illustrated which correspond to the relevant time sections.

FIG. 2b shows the current IL through the storage inductor L as a function of time. FIG. 2c shows the potential at the node V7 as a function of time.

In the phase ta, the switching element T1 is switched on and the threshold value element T2 is switched off. The potential present at the node V4 increases proportionally to the current IL through the storage inductor. The potential at the node V6 in this case approximately corresponds to the reference potential GND. If the potential at the node V7, which is connected to the node V4 via the resistor R3, exceeds the switch-on threshold voltage of the threshold value element T2, the threshold value element T2 is switched on and the switching element T1 is switched off. The maximum current through the step-up converter is therefore also limited. The corresponding time t2 defines the end of the time interval ta.

After the time t2, there is the time interval tb. The threshold value element T2 is switched on at time t2 indirectly by the potential at the node V4 via the resistor R3. In this case, the switching element T1 is switched off by the threshold value element T2. At the node V6, the potential at time t2 jumps to a value which is markedly above the reference potential GND. The storage inductor is demagnetized during the time interval tb. A current is flowing through C1, R1 and R2 to the control input of the threshold value element T2 and keeps said threshold value element switched on as long as the demagnetization current is flowing. The switching element T1 is switched off since the potential at its control input no longer exceeds the switch-on threshold.

The time interval tb ends with the complete demagnetization of the storage inductor L. The potential at the node V2 therefore jumps to the potential at the node V1 at the end of the time interval tb. This jump defines the time t1 and brings about, via the output capacitor C1, the resistor R1 and the diode D3, a potential at the node V6 which approximately corresponds to the reference potential GND. At the control input of the threshold value element T2, the potential is no longer sufficient for keeping the threshold value element T2 switched on. It turns off.

The voltage across the intermediate circuit capacitor C2 now switches the switching element T1 on via the resistor R4. A new phase ta begins again. The high-frequency oscillation of the step-up converter proceeds automatically.

In order to start the oscillation, it is possible to distinguish between two cases. In the first case, the threshold value element T2 is switched off and a sufficient voltage is present at the intermediate circuit capacitor C2. Then, the switching element T1 is switched on by the voltage across the intermediate circuit capacitor via R4. In the second case, the control circuit can set the voltage at the node V6 to the reference potential GND for a short period of time via the signal line IS. As a result, the switching element T1 is switched on via the resistor R4.

The second case can occur if, when the supply voltage AC is first applied, the capacitors C1 and C2 are charged parallel to the potential V. The potential V6 then cannot fall below the switch-on threshold voltage of the threshold value element T2 during a time which is considerably longer than the period duration of the step-up converter. The threshold value element T2 cannot be switched off until the charging of the intermediate circuit capacitor C2 to the highest instantaneous value of the supply voltage is complete. In this state, the step-up converter is blocked by the threshold value element T2.

The control circuit can block the operation of the step-up converter at any time via the signal line SD. This can take place, for example, when a desired voltage is reached at the intermediate circuit capacitor C2.

The threshold value element T2 has, in a circuit arrangement as described above, a plurality of functions: a first function is a threshold value element for detecting signals at the node V7; the second function is driving the switching element T1. Furthermore, the threshold value element also functions as an inverter.

In the circuit arrangement shown in FIG. 1, the resulting maximum current through the storage inductor L is dependent on the tolerance of the switching threshold of the threshold value element T2.

Figure 3:
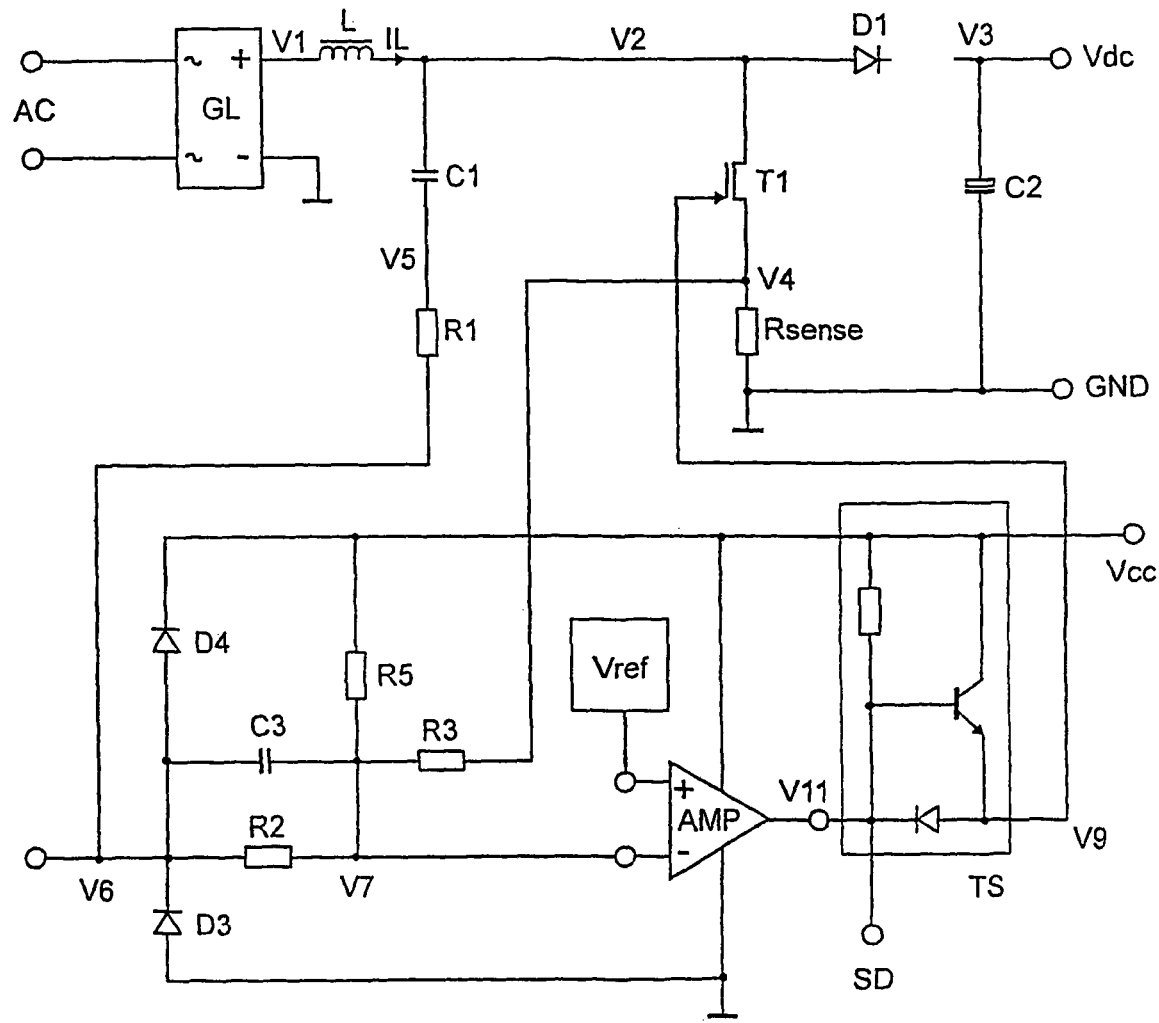
FIG. 3 shows a modification of the circuit arrangement shown in FIG. 1.
Figure 4:
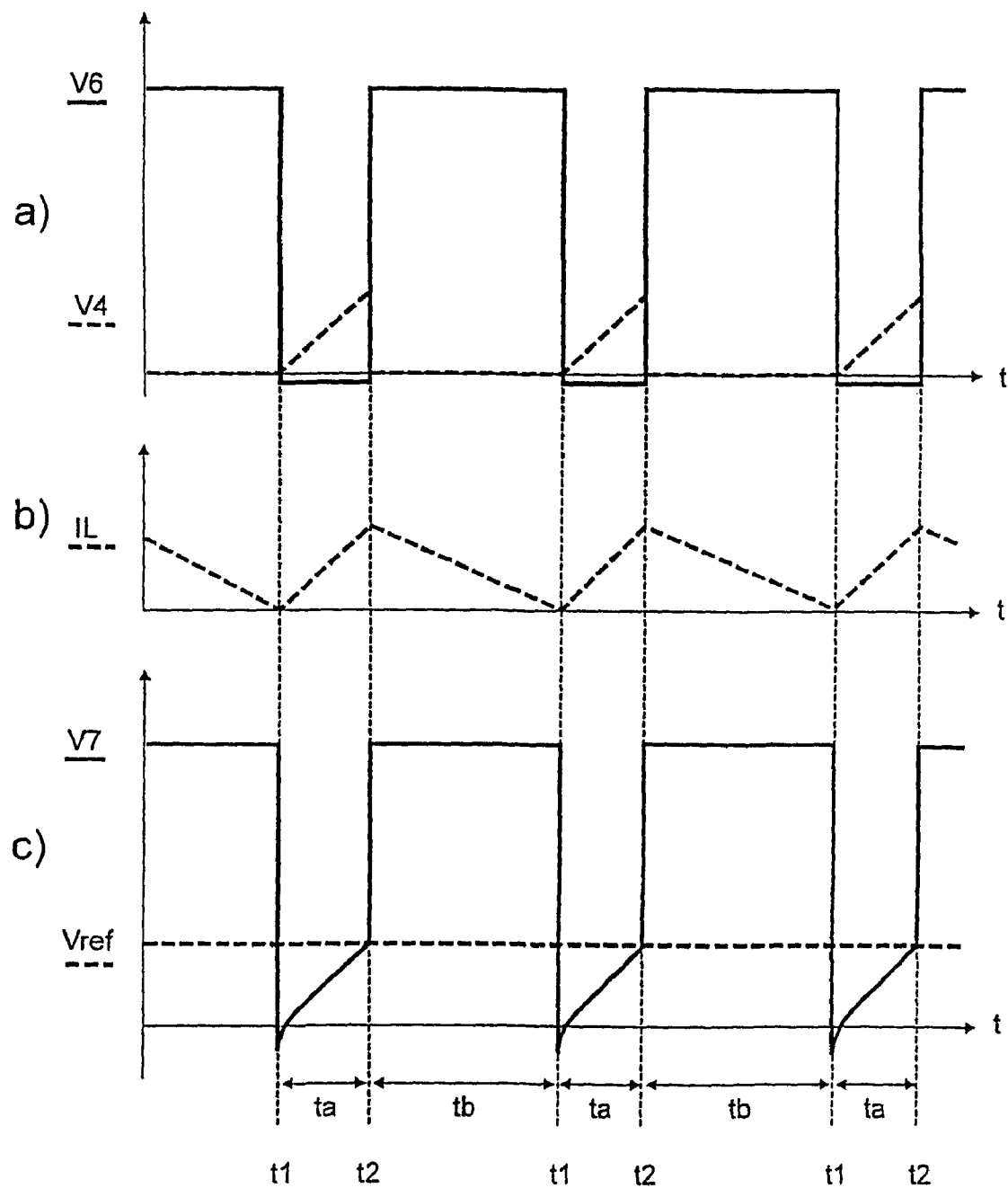
FIGS. 4a, b, c show relevant current and voltage profiles of the circuit arrangement shown in FIG. 3.

FIG. 3 shows a circuit diagram relating to a second circuit arrangement according to the invention, which is improved in this regard.

Instead of a transistor, a comparator AMP with a downstream driver circuit TS is used as the threshold value element. Since the comparator AMP cannot alone make available the power for driving the switching element T1, the driver circuit TS is connected downstream of it. The comparator AMP receives a separate voltage supply Vcc. A diode D4 is connected between the node V6 and the positive supply potential Vcc. A capacitor C3 can be connected in parallel with the resistor R2. This accelerates the rise in the potential at the node V7 in the event of a rise in the potential at the node V6 at the time t1 because it transfers the potential jump differentially. The recharging of C3 takes place considerably more quickly than the rise in the voltage at the node V7 as a result of the increase in the current IL. The effect is already considered in FIG. 2c. The capacitor C3 is illustrated in FIG. 3. A resistor R5 for the supply voltage Vcc is connected between the capacitor C3 and the resistor R3.

A switch-off threshold Vref is supplied to an input of the comparator AMP. This switch-off threshold corresponds to the switch-off criterion for the switching element T1. It can be fixed so as to be constant, but may also be variable, for example proportionally to the profile of the input voltage AC.

The input of the comparator should not be subjected to excessively high voltages. The event of the switching element T1 being switched off at time t2 causes a voltage jump at the node V7. In order to limit this jump, a diode V4 is connected from the node V6 to the positive supply potential Vcc of the comparator. As a result, the voltage at the node V6 is limited to a potential which is higher than the supply potential Vcc of the comparator by the forward voltage of the diode D4.

In order to reduce the sensitivity of the comparator to interference, a so-called pull-up resistor R5 is connected between the node V7 and the positive supply potential Vcc. The potential at the node V7 is therefore raised away from the reference potential. As a result, although the signal deviation is reduced, the measure can nevertheless be advantageous because the signal-to-noise ratio can be improved.

The introduction to the description describes the fact that it may be desirable to set the parameters of the step-up converter as a function of whether the electronic ballast is operated using a phase gating dimmer or not. Firstly, a circuit arrangement is proposed for identifying whether the ballast is being operated using a phase gating dimmer or not. Then, this circuit arrangement can be connected to the circuits from FIGS. 1 and 3 as described.

Figure 5:
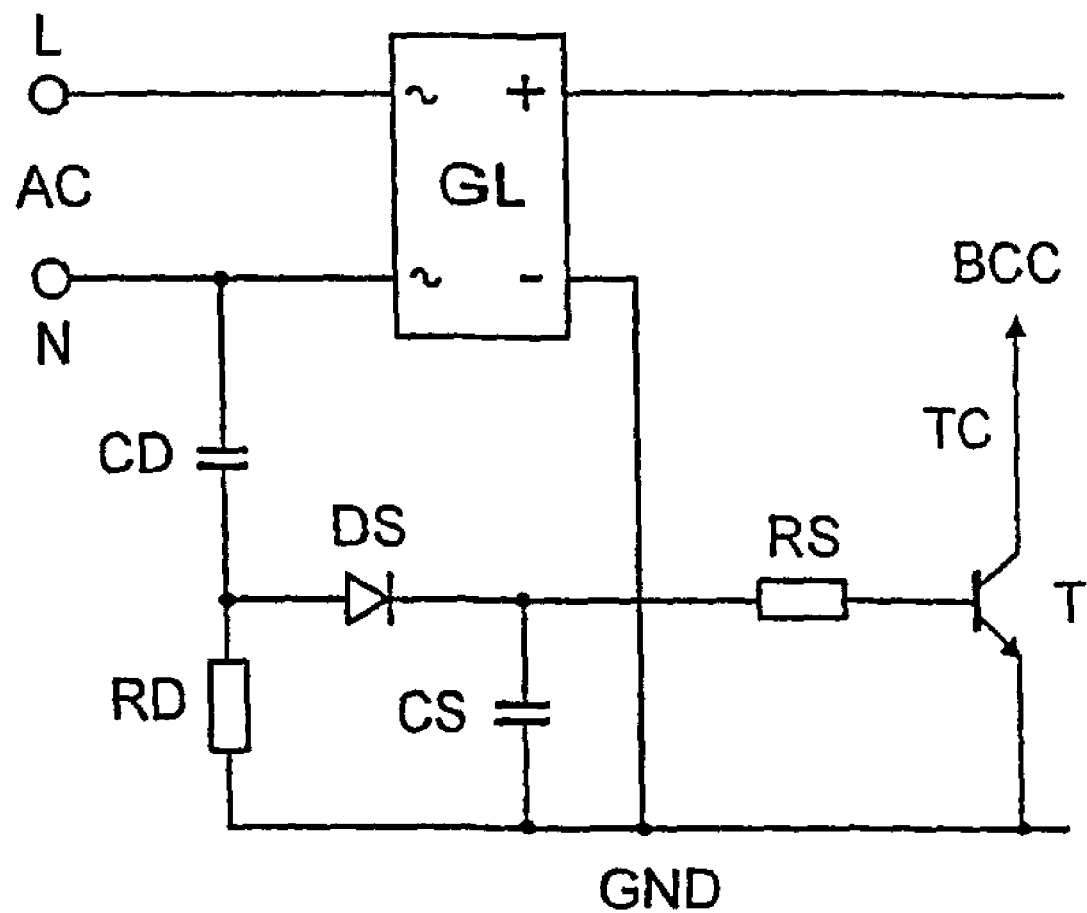
FIG. 5 shows a circuit arrangement for detecting phase gating in the supply voltage.

FIG. 5 shows a circuit arrangement according to the invention for identifying whether the electronic ballast is being operated directly on the supply system or using a phase gating dimmer. A capacitor CD is connected to one of the system feed lines N or L as a differentiating element. A resistor RD, which connects the capacitor CD to the reference potential GND, is connected in series with this capacitor CD. At the node between the capacitor CD and the resistor RD, the anode of a diode DS is connected whose cathode is connected in series with a further capacitor CS, likewise to the reference potential GND. This circuit represents a peak value detection circuit of the voltage occurring across the resistor RD. The base of a transistor T is connected to the node between the capacitor CS and the diode DS via a resistor RS. The emitter is connected to the reference potential GND and the collector TC is connected to elements of the step-up converter which can influence the running of the step-up converter operation. Specific circuitry is specified further below.

If the electronic ballast is connected directly to the system supply, no substantial jumps in the supply voltage occur. The component parts of the circuit arrangement in FIG. 5 are designed such that the peak value of the voltage across RD is stored in the capacitor CS via the diode DS and the voltage across the capacitor CS cannot switch the transistor T on.

If the electronic ballast is connected to the supply system via a phase gating dimmer, the supply voltage demonstrates significant jumps. In this case, high peak values occur across the resistor RD, so that the capacitor CS is charged to significantly higher values in comparison with operation without a phase gating dimmer. The voltage across the capacitor CS can now change the transistor T over to a conductive state via the resistor RS, whereby the collector-side output of the transistor TC is approximately at the reference potential GND.

The step-up converter can be addressed via the output TC of the transistor T, so that the switch-off current threshold is reduced.

In FIG. 1, the switch-off current threshold is determined by the resistors R2 and R3. If a resistor is switched from the potential at the node V7 to the reference potential GND via the switch T, the resulting desired value is greater if the switch T is switched on.

In FIG. 3, the switch-off current threshold is determined by the reference voltage Vref. The voltage Vref can be produced by a voltage divider circuit comprising resistors. A resistor can be connected in parallel with one of these resistors via the switch T. The reference voltage Vref therefore changes by means of the switch T being switched on and off.

The invention claimed is:

1. An electronic ballast for a discharge lamp with a step-up converter (L, D1, T1, C2), which has a storage inductor (L), a diode (D1), an intermediate circuit capacitor (C2) and a switching element (T1), characterized in that it is designed
   to switch off the switching element (T1) in the step-up converter (L, D1, T1, C2) when a maximum current value of the current flowing through the switching element (T1) is reached, and
   to switch on the switching element (T1) by means of a jump in the potential (V2) between the storage inductor (L) and the diode (D1) after demagnetization of the storage inductor (L),
   so that the step-up converter (L, D1, T1, C2) oscillates in self-excited fashion.

2. The electronic ballast as claimed in claim 1 with a capacitor (C1), which is connected to the potential (V2) between the storage inductor (L) and the diode (D1) of the step-up converter (L, D1, T1, C2), for outputting the potential jump between the storage inductor (L) and the diode (D1) after the demagnetization of the storage inductor (L).

3. The electronic ballast as claimed in claim 1 with a coil, which is secondary to the storage inductor (L) of the step-up converter (L, D1, T1, C2), for detecting the demagnetization of the storage inductor (L).

4. The electronic ballast as claimed in claim 2 with a first signal line (SD), which is connected to the control input (V8) of the switching element (T1), so that the switching element (T1) can be blocked by a control circuit via the signal line (SD).

5. The electronic ballast as claimed in claim 1 with a resistor (R4), which is connected between the supply potential (V3) of the intermediate circuit capacitor (C2) and the control input (V8) of the switching element (T1) and via which, for the automatic stimulation of the oscillation, the voltage switches on the switching element (T1) via the intermediate circuit capacitor (C2).

6. The electronic ballast as claimed in claim 4, in which a control input (V7) of a threshold value element (T2, AMP) of the step-up converter (L, D1, T1, C2) for the purpose of driving the switching element (T1) is connected both to the potential (V2) between the storage inductor (L) and the diode (D1), via a capacitor (C1) and at last one resistor (R1), and to the potential (V4) between the switching element (T1) and a measuring resistor (Rsense), via at least one resistor (R3).

7. The electronic ballast as claimed in claim 1 with a first signal line (IS), which connects a control input (V7) of a threshold value element (T2, AMP) and a control circuit for driving the step-up converter (L, D1, T1, C2) and to which the threshold value element (T2, AMP) of the control circuit can be connected, so that the self-excited oscillation of the switching element (T1) can start up.

8. The electronic ballast as claimed in claim 1, with a comparator (AMP) and a driver circuit (TS), which is connected downstream of the comparator (AMP), for driving the switching element (T1) in the step-up converter (L, D1, T1, C2).

9. The electronic ballast as claimed in claim 8, in which an input (V7) of the comparator (AMP) is connected to the potential (V2) between the storage inductor (L) and the diode (D1) via at least one resistor (R2) and a capacitor (C1), a capacitor (C3) being connected in parallel with said resistor (R2), so that the potential jump in the potential (V2) between the storage inductor (L) and the diode (D1) after the demagnetization of the storage inductor (L) is transferred differentially to the input (V7) of the comparator (AMP).

10. The electronic ballast as claimed in claim 8, in which a DC voltage is superimposed on an input signal (V7) of the comparator (AMP), so that the signal-to-noise ratio between the reference potential (GND) and this input signal (V7) is increased.

11. The electronic ballast as claimed in claim 8, in which a reference voltage (Vref), which is proportional to the instantaneous value of the voltage of the supply (AC), is supplied to the comparator (AMP).

12. The electronic ballast as claimed in claim 1 for selectively operating a discharge lamp directly on a system supply or using a phase gating dimmer, jumps in the supply voltage being output by a differentiator (CD, RD), which is connected between one of the system lines and the reference potential of the ballast, and passed on to a controller (R2, R3, Vref) of the ballast so that the controller (R2, R3, Vref) can distinguish between operation using the phase gating dimmer and on the system supply.

13. The electronic ballast as claimed in claim 12, in which the controller (R2, R3, Vref) controls the step-up converter in such a way that it has a low switch-off current threshold during operation on the system supply, so that the step-up converter draws a current from the system supply which has a lower amplitude than during operation using the phase gating dimmer.

14. A discharge lamp with an integrated electronic ballast as claimed in claim 1.

15. A method for operating an electronic ballast for a lamp with a step-up converter (L, D1, T1, C2), which has a storage inductor (L), a diode (D1), an intermediate circuit capacitor (C2) and a switching element (T1), characterized in that the switching element (T1) in the step-up converter (L, D1, T1, C2) is switched off when a maximum current value of the current flowing through the switching element (T1) is reached, and the switching element (T1) is switched on by a jump in the potential (V2) between the storage inductor (L) and the diode (D1) after the demagnetization of the storage inductor (L), so that the step-up converter (L, D1, T1, C2) oscillates in self-excited fashion.

16. The electronic ballast as claimed in claim 1 with a first signal line (SD), which is connected to the control input (V8) of the switching element (T1), so that the switching element (T1) can be blocked by a control circuit via the signal line (SD).

17. The electronic ballast as claimed in claim 2 with a resistor (R4), which is connected between the supply potential (V3) of the intermediate circuit capacitor (C2) and the control input (V8) of the switching element (T1) and via which, for the automatic stimulation of the oscillation, the voltage switches on the switching element (T1) via the intermediate circuit capacitor (C2).

18. The electronic ballast as claimed in claim 17, in which a control input (V7) of a threshold value element (T2, AMP) of the step-up converter (L, D1, Tl, C2) for the purpose of driving the switching element (T1) is connected both to the potential (V2) between the storage inductor (L) and the diode (D1), via a capacitor (C1) and at last one resistor (R1), and to the potential (V4) between the switching element (T1) and a measuring resistor (Rsense), via at least one resistor (R3).

19. The electronic ballast as claimed in claim 9, in which a DC voltage is superimposed on an input signal (V7) of the comparator (AMP), so that the signal-to-noise ratio between the reference potential (GND) and this input signal (V7) is increased.

\* \* \* \* \*